United States Patent [19]

Milner

[11] 4,354,356
[45] Oct. 19, 1982

[54] TEMPERATURE-CYCLED COLD TRAP

[75] Inventor: Christopher J. Milner, Northbridge, Australia

[73] Assignee: Unisearch Limited, Kensington, Australia

[21] Appl. No.: 260,288

[22] Filed: May 4, 1981

[30] Foreign Application Priority Data

May 2, 1980 [AU] Australia .............................. PE3389

[51] Int. Cl.³ .............................................. B01D 8/00
[52] U.S. Cl. ...................................... 62/55.5; 55/269; 62/268; 417/901
[58] Field of Search ....................... 62/55.5, 100, 268; 55/269; 417/901

[56] References Cited

U.S. PATENT DOCUMENTS

| | | | |
|---|---|---|---|
| 2,512,040 | 6/1950 | Slobod | 62/55.5 |
| 3,457,655 | 7/1969 | Winkler et al. | 62/55.5 |
| 3,625,018 | 12/1971 | Roberts | 62/55.5 |
| 3,712,074 | 1/1973 | Boissin | 62/55.5 |
| 4,182,749 | 1/1980 | Green et al. | 62/55.5 |

*Primary Examiner*—Ronald C. Capossela
*Attorney, Agent, or Firm*—Michael J. Striker

[57] ABSTRACT

A cold trap for use in a high vacuum system to analyze the vapor component or components of the gases in, or introduced into, the vacuum system, including the assessment of the partial pressure of any specific component which may be present in the said gases, comprising a chamber closed at its upper end by a thin metallic diaphragm dished inwardly to receive a liquid coolant such as liquid nitrogen, an outlet to interconnect the chamber with a high vacuum system, and means to introduce successive doses of liquid coolant into the diaphragm. This construction allows the trap to be rapidly cycled. It is shown to be advantageous for the radius of curvature of the lowest part of the diaphragm to be such that the area of the diaphragm which remains at the temperature of the coolant until all the coolant has evaporated is larger than the effective area of the outlet.

10 Claims, 5 Drawing Figures

TEMPERATURE-CYCLED COLD TRAP

This invention relates to a cold trap for use in high-vacuum apparatus, particularly for use in instruments for measuring the pressure of gas in the instrument, and/or the partial pressure of one or more components of the said gas, and/or of a gas or mixture of gases admitted into the apparatus for analysis.

Many high-vacuum systems incorporate a cold trap. Such cold traps are very often cooled, by means of liquid nitrogen, to the boiling-point of that liquid, i.e. approx. 78 K. Except for "permanent gases", which include helium and the other inert gases, hydrogen, nitrogen, oxygen, methane and carbon monoxide, the partial pressure of every component of the gas becomes essentially zero at points adjacent to the cold surface of the trap, which acts as a pump for these component gases in parallel with other pumps in the system, and the said components collect in the trap as a condensate.

If the coolant liquid nitrogen is allowed to evaporate to dryness, the trap warms up, and the condensate which has collected in it evaporates. In many cases where the condensate comprises two or more components (i.e. distinct chemical species), each specific component evaporates separately as the trap temperature rises through a value characteristic of that species. The separation may be observed as successive "waves" of pressure which arise in the system during the selective evaporation of the respective components. (The term "wave" is here used in the sense common in descriptions of polarography as a technique for electrochemical analysis). Further, if the time during which the trap temperature rises from 78 K. to a value near ambient (hereinafter called the "warming time") is much less than the time for which the trap has been held at 78 K. (hereinafter called the "cold time"), then the transient pressure observed during evaporation will be much larger than the steady partial pressure of the condensate component(s) while the trap is at ambient temperature.

The present invention consists in a cold trap for use in a high vacuum system, comprising a chamber closed at its upper end by a thin metallic diaphragm dished inwardly to receive a liquid coolant, an outlet to interconnect the chamber with a high vacuum system, and means to introduce successive doses of liquid coolant into the diaphragm.

The arrangement according to this invention allows the trap to be rapidly cycled if desired due to the high thermal conductivity of the thin metallic dish into which the coolant is introduced and the rapidity with which it may be equilibrated with ambient temperature.

Preferred embodiments of the present invention provide means for (1) identifying condensable components of a gas, present in or introduced into, a high-vacuum system, and/or determining the quantitative composition of such gas; and (2) determining the partial pressure of a specific component of the gas present in a high-vacuum system with enhanced sensitivity; and, to do the same (1) and (2) by sampling said gas at a convenient high rate in time.

Particularly but not only in connection with object (1), it is desirable that the temperature should at every instant be uniform over the area of the trap surface (hereinafter called the "central zone") from which evaporation of condensate takes place to generate successive waves of pressure. However, since the vacuum wall must be continuous solid material from the cooled to the uncooled parts, the temperature distribution must also be continuous; and it follows that during the cold time, while the central zone is at 78 K., it will be surrounded by peripheral cooled zones in which the surface temperature is higher. Also, during the warming time, the central zone will be surrounded by zones where the instantaneous temperature reached the present central-zone value at earlier times. Therefore, previous to the time when evaporation of a designated component is proceeding from the central zone, some of the same component will evaporate from a peripheral zone, and may become confused with the vapour of another component then evaporating from the central zone at its then-lower temperature.

Preferably the radius of curvature of the lowest part of the diaphragm is such that the area of the diaphragm which remains wetted by coolant and/or temperature of the coolant remains larger than the effective area of the outlet until all the coolant has evaporated.

The diaphragm is preferably made of a very thin sheet of a metal, e.g. of brass or platinum. The radius of curvature of the diaphragm is preferably at least five times the radius of the outlet, or, if the outlet is not circular in cross section, at least five times the radius of a circle which has the same cross sectional area as the outlet.

The chamber is preferably of as small a volume as is possible and is preferably tapered inwardly from the dished diaphragm to the outlet.

Hereinafter given by way of example only is a preferred embodiment of the present invention described with reference to the accompanying drawings in which.

Figure 1:
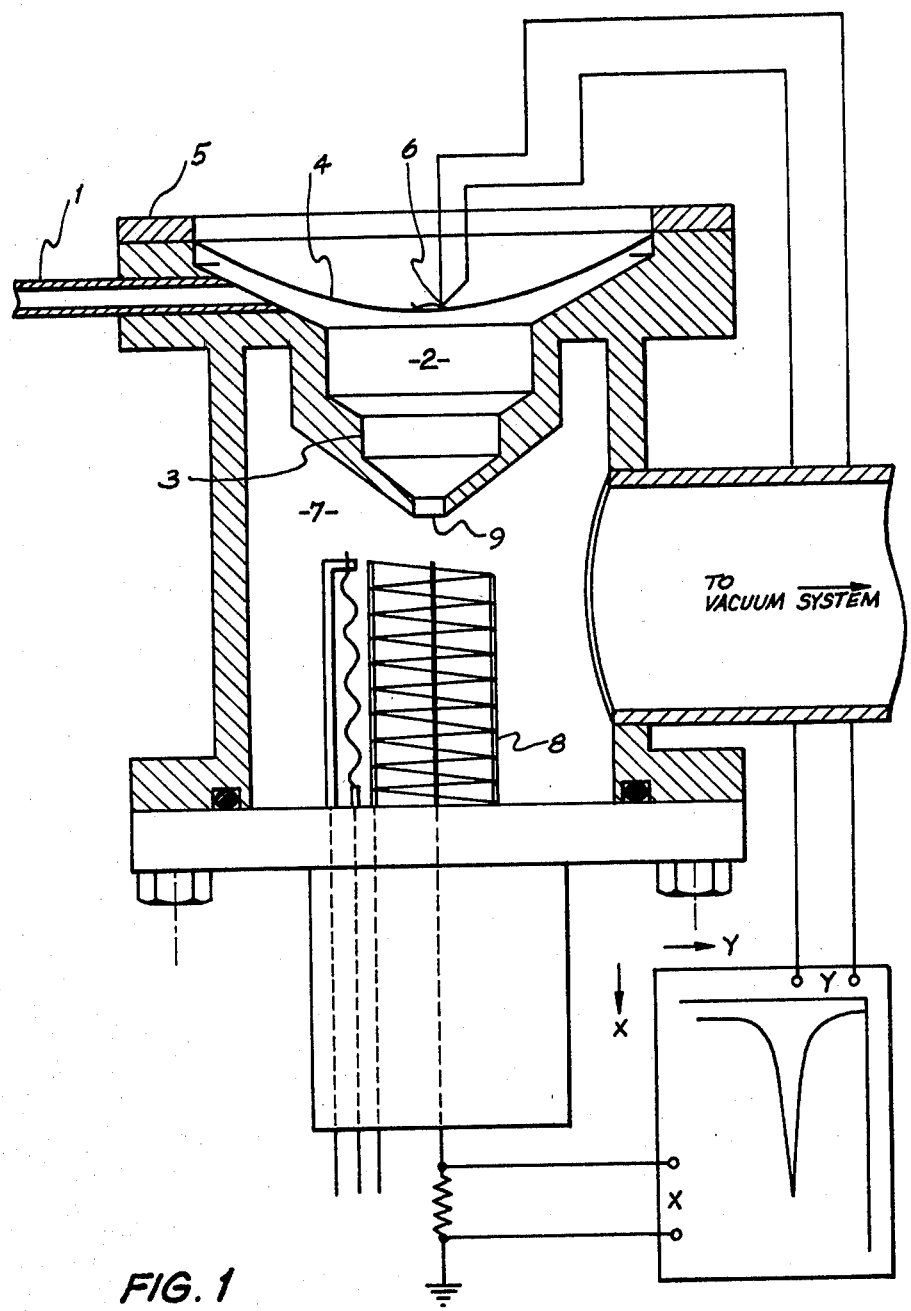
FIG. 1 is a vertical sectional view of a cold trap according to the present invention.

FIG. 1 shows the construction of a specific embodiment of the invention preferred specifically for use as a gas analyser, viz. for object (1) above. Gas to be analysed is admitted at a suitable rate through a narrow tube 1; this leads into the interior of a chamber 2, formed between a funnel-shaped member 3 and a small dish or saucer 4. It is convenient to make the saucer 4 from metal sheet as thin as possible consistent with its being (a) impervious to air and (b) strong enough to withstand the atomspheric pressure which acts on its concave upper and outer side; brass, 0.001 inches or 25 $\mu$m thick, has been found suitable. In a specific construction, the saucer 4 is 45 mm diameter and constitutes a segment of a sphere of 45 mm radius. The rim of the saucer is sealed, vacuum tight, to the rim of the brass funnel 3 with soft solder, while clamped down by brass ring 5.

Two wires of different metals, connected together and to the centre of the saucer 4, form a thermocouple 6 which continuously indicates the temperatue of the central zone of the saucer 4. These wires should both be of small diameter, and also should be joined and attached to the saucer 4 with a minimum quantity of solder, if the instrument is to attain a desirably rapid response; copper wire 75 μm and Constantan (Eureka) of 125 μm diameter, are suitable.

In operation, a small quantity of liquid nitrogen is poured into saucer 4, forming a pool suitably about 20 mm diameter, thus bringing a large central zone of the saucer 4 to 78 K. All condensable components of the gas being admitted then continually condense on this area of the underside of the saucer 4. The said quantity of liquid keeps the central zone at 78 K. for a cold time of about 20 s.

The outside of funnel 3 forms part of the wall of a second chamber 7 which houses a continuously-indicating and fast-acting pressure gauge 8, such as a hot cathode ion gauge of which the electrodes are shown in FIG. 1. Chamber 2 is connected to the second chamber 7 only by the small orifice 9 of funnel 3; in the described embodiment, the orifice 9 is of diameter 3 mm. It is found that until 1 second or less before the end of the cold time, a central area of the saucer, 6–8 mm or more in diameter, remains wetted by liquid nitrogen; and thus that the central zone remains of at least this diameter while at 78 K. It follows that, in accordance with the invention, the central zone pumps vapour, formed by evaporation from peripheral areas, with a speed large compared with that at which it is pumped through orifice 9, the speeds being proportional to the squares of the diameters. quoted.

The electromotive force of thermocouple 6 is displayed as a Y-deflection on a fast-acting chart recorder 10, the X-deflection of which can be switched between an internal time-base and the electrical output of gauge 8. Using the former option, it is found that, after all liquid nitrogen has evaporated, the temperature of the thermocouple 6 rises at about 150-50 K/s. Experiments on the pressure waves due to various condensable gases have shown (1) that a single condensable compound gives rise to a wave which is typically (a) 20 K. wide at half-height, (b) sharp-tipped to 1-2 K., and (c) of a height increasing with the cold time and also with the partial pressure of the compound when the trap is not cooled; (2) that for a given compound, the temperature when the wave is at its peak is typically (a) repeatable to ±1-2 K., if of a constant height, (b) increased by about 16 K. for a 10-fold increase in height, (c) for a constant height, has a value characteristic of the compound as indicated in the following table:

Carbon dioxide, $CO_2$ 122 K.
Ammonia, $NH_3$ 138 K.
Ethoxyethane, $(C_2H_5)_2O$ 157 K.
Acetone, $(CH_3)_2CO$ 171 K.
Methanol, $CH_3OH$ 188 K.
Benzene, $C_6H_6$ 190 K.
Ethanol, $C_2H_5OH$ 198 K.
Water, $H_2O$ 215 K.
1, 2-ethanediol, $(CH_2OH)_2)$ 267 K. (ethylene glycol))

Accordingly, the temperature at which a peak is found can be used as a datum to identify an unknown condensable gas.

The resolving power of the apparatus regarded as such an analytical instrument depends on the sharpness of the peaks ((1) (b) above). From the rate of temperature rise observed, it follows that the peak is traversed in about 20 ms; pressure changes in such a time can be observed only if all the time-constants, both that of the recorder X-deflection system, and those given by the ratios (a) (volume of chamber 2)/(speed of pumping of chamber 2) and (b) (volume of the second chamber 7)/(speed of pumping of the second chamber 7) are no greater than about 20 ms. The speed of pumping of chamber 2 is limited by orifice 9 to about 0.3 liter/s, and so the volume of chamber 2 should not exceed about 6 ml. Since chamber 7 must be at least about 100 ml in volume to house a typical pressure gauge, the speed of pumping of the second chamber 7 should be no less than about 4 l/s.

Figure 2:
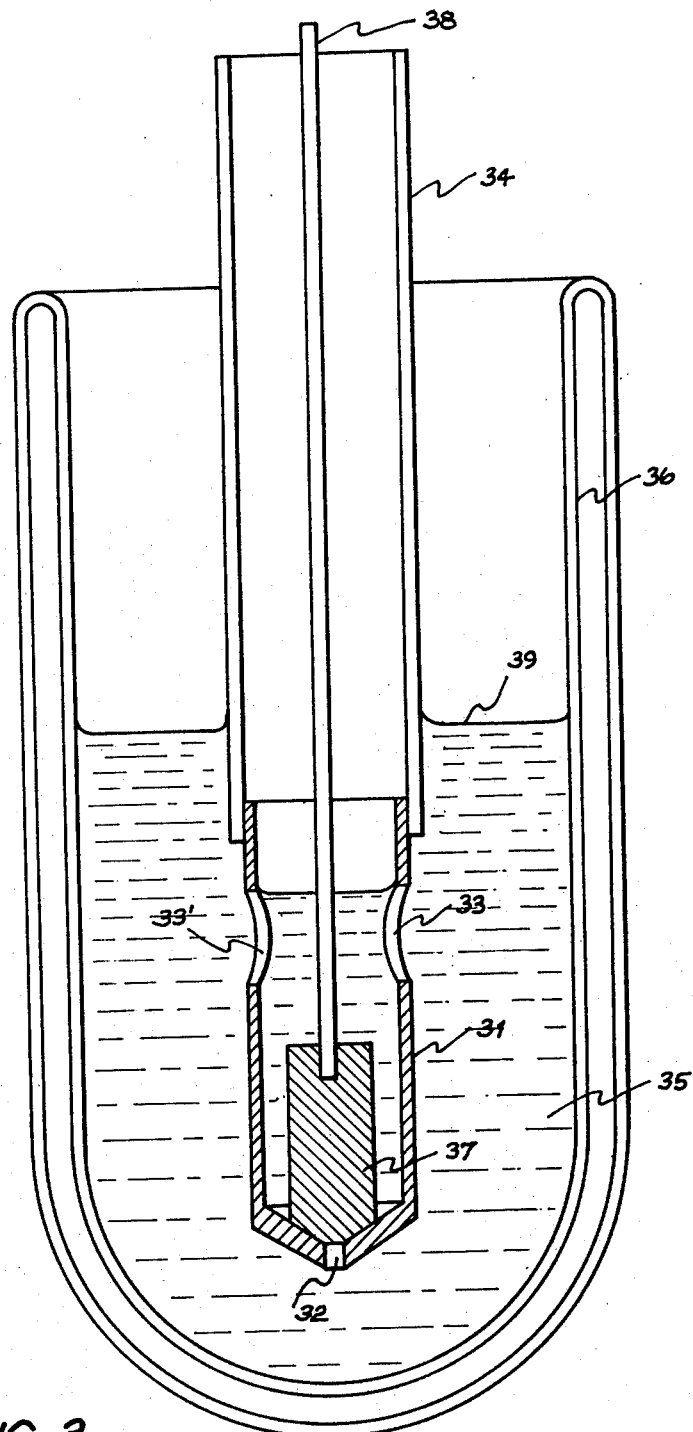
FIG. 2 is a vertical sectional view of means to supply a coolant liquid to the cold trap of FIG. 1.

FIG. 2 shows a serviceable liquid-nitrogen dispenser, comprising a small bucket, constituted by the lower part of a tube 31, closed at the bottom except for a small hole 32, and perforated laterally at a suitable height above the bottom by one or more holes 33, 33'. Tube 31 is mounted on, or is itself the lower end of, a thermally-insulating handle (conveniently in the form of a tube) 34, by means of which tube 31 can be lowered into and removed from a stock of liquid nitrogen 35 in a Dewar flask or other container 36. Inside tube 31 is a plug 37, mounted on an independent thermally-insulating handle 38, which conveniently may extend inside the handle 34 to the top thereof. The bottom end of plug 37 and the inside of the bottom of tube 31 are machined or ground or otherwise made to fit closely together and make a liquid-nitrogen-tight seal.

In operation, when the assembly as shown has been immersed for a few seconds in the liquid nitrogen in the container 36, the liquid 35 fills the whole interior of tube 31 and handle 34, at least up to the top of 33 and/or 33'. When tube 31 is raised by the handle 34 so that the hole 33 and 33' are above the free surface 39 of the liquid 35 in container 36, liquid pours out of holes 33 and 33' until the level in tube 31 is no higher than the lowest part of holes 33, 33'. If plug 34 is properly seated, the liquid then in tube 31 remains there while the tube 31 is lifted clear of container 36 and positioned above saucer 4. On raising plug 34 by means of handle 38 this standardised quantity of liquid pours out through aperture 32. The tube 31 remains cold and so immediately refills when reinserted in the container 36. With a dispenser as described it has been found possible to standardise the cold time of 4 at, e.g. 15 s to better than ±0.5 s.

Figure 3:
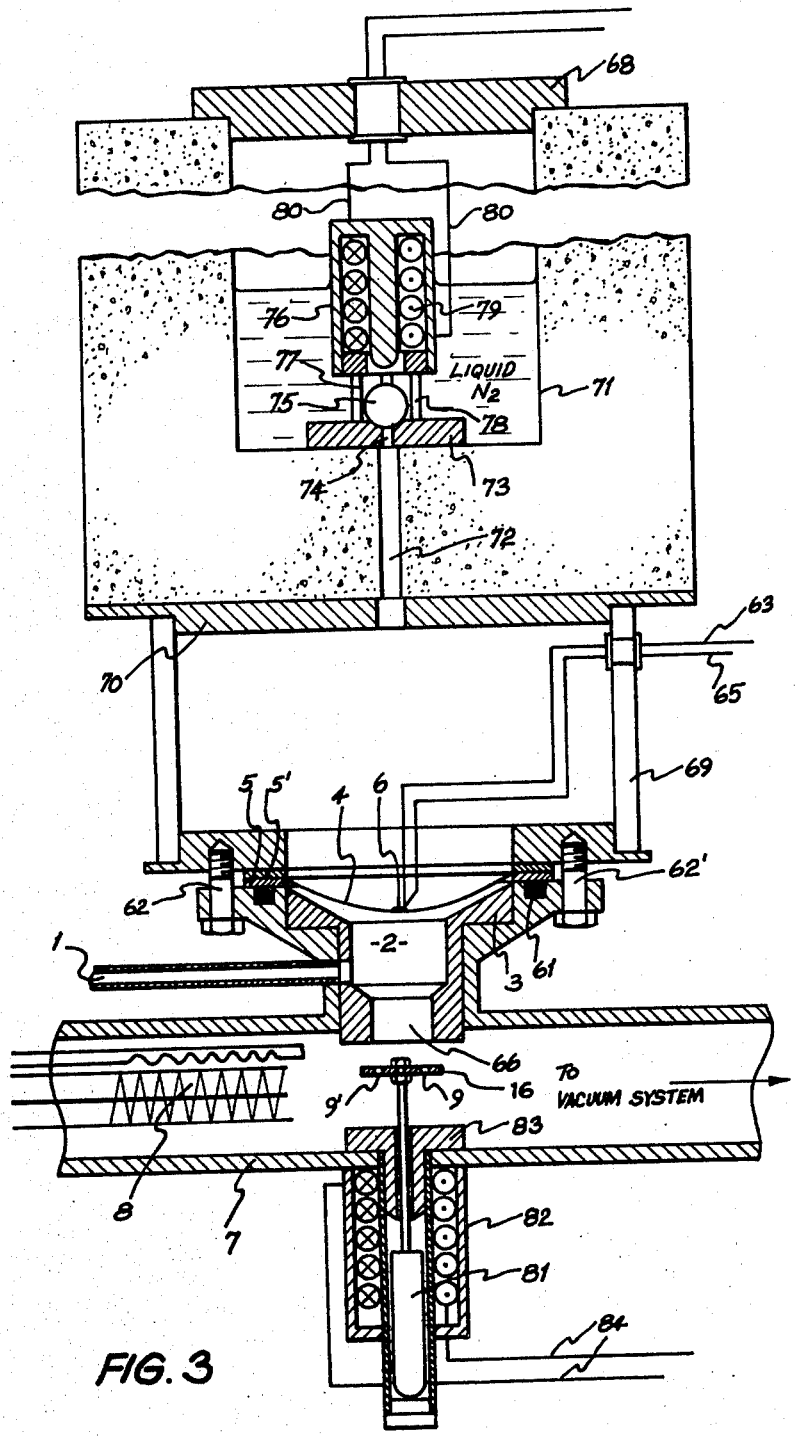
FIG. 3 is a vertical sectional view of a cold trap according to another embodiment of the invention.
Figure 4:
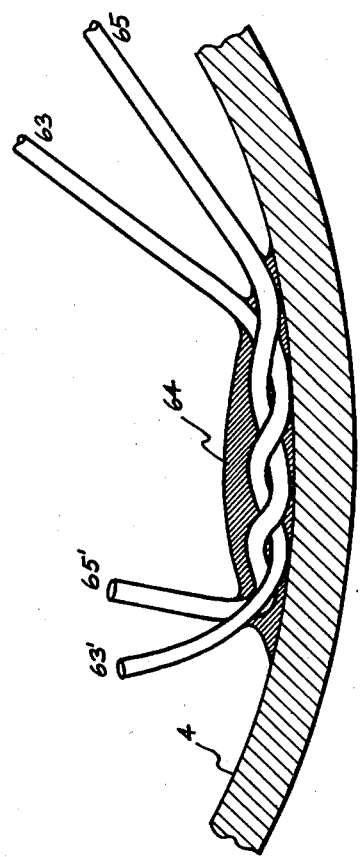
FIG. 4 is a side elevational view of a thermocouple for mounting on the cooling liquid receptacle of the cold trap of FIG. 3.

An alternative and improved embodiment of the invention will now be described, with reference to FIGS. 3 and 4. In FIG. 3, numerals less than 60 identify parts corresponding to those parts in FIG. 1 which bear the same numerals.

FIG. 3 is a cross-sectional view of a cold-trap apparatus, into which gas to be analysed may be admitted through a narrow tube 1 to the interior of a cold trap 2, basically comprising a funnel-shaped member 3 which is covered by a small dish or saucer 4. As described with reference to FIG. 1, the saucer 4 may be made from brass sheet 25 μm thick, using simple press tools. It has been found convenient to solder together the flange of saucer 4 and two brass rings, 5 and 5'; and to seal this sub-assembly to the flanged top arm of the chamber 7, using an 'O-ring' 61 and a number of clamping bolts 62, 62', etc.

It has been found that if it is desired to operate with cold times less than 10 to 15 seconds, and correspondingly-small doses of liquid nitrogen are repeatedly delivered, cooling of the trap and thermocouple to the boiling-point of nitrogen may occur only after an erratic delay if at all. This appears to result from the small dose of liquid forming one or more "Leidenfrost drops", i.e. assuming the "spheroidal state" in which a film of vapour forms between the drop and the relatively-hot surface below.

It has been found possible to ensure quick chilling of saucer 4, followed by a cold time of only 5 to 10 s, by use of the specific construction for thermocouple 6 shown in FIG. 4 and described as follows. After assembly of saucer 4 to rings 5 and 5', a small area at the centre of saucer 4 is cleaned and tinned and then de-soldered by absorbing all surplus molten solder into a sponge of fine copper wire. The thermocouple 6 is made as shown in FIG. 4, by twisting together a strand of copper wire 63 and one of Constantan wire 65 for 1 to 1.5 turns. (So-called "free soldering" insulated wires may be used alternatively to bare wires). While the four wire-ends are held diverging from either end of the twisted portion at 90° approximately, the twist is immersed in molten solder on a bit; the bit is then removed (downwards) so that a solder bead about 1.5 mm long×0.5 mm dia. encases the twist. Both wires are then cut, at 63' and 65' respectively, about 1.5 mm from one end of the bead, and the latter is pressed against and welded to the tinned patch on the saucer, using a hot bit made of nickel-chromium alloy or otherwise having a surface not readily tinned. In FIG. 4, the final solder bead is shown in section where it unites the wires 63, 65 with the saucer 4. The cut ends 63', 65' are bent up as shown so as to stand about 1 mm above the surface of 4 approximately at its centre and lowest point.

The construction described also secures incorporation of a minimum quantity of solder so that fast heating follows when all liquid nitrogen has evaporated.

Returning to FIG. 3, trap 2 is connected to the vacuum system by the relatively short and wide neck 66 of funnel 3. During most or all of the cold time, vapours present in the vacuum system and passing through chamber 7 are therefore pumped with relatively-high speed into the trap 2. During the warming time, however, it is arranged that plate 16, perforated with one or more small holes 9, 9', is pressed against the lower end of the neck 66, and the speed is thus restricted.

Use of a movable plate such as 16, or other means to provide a high-speed connection between chambers 2 and 7 during the cold time, is only desirable if the object is to analyse with high sensitivity gas that is already present in the vacuum system. The apparatus of FIG. 1 is intended specifically to analyse gases introduced for analysis through tube 1; and for this purpose use of a fixed small orifice 9 is of no disadvantage, and has a small secondary advantage in sensitivity by maximising the proportion, of a condensable component in the sample, that is condensed on the trap and not pumped away during the cold time.

Plate 16 is mounted on a thin and/or non-magnetic upward extension of magnetic armature 81, which normally rests on the closed bottom of the (non-magnetic) bottom arm of chamber 7, but is attracted upward, so that plate 16 is pressed against the funnel shaped member 3, when solenoid 82 is energised. The two side arms of chamber 7 respectively contain the ionisation pressure gauge 8, and lead to the vacuum system.

The apparatus of FIG. 3 is intended chiefly for use as a sensitive partial-pressure gauge for a condensable component of the gas present in the vacuum system to which it is attached, i.e. to serve object (2) of the invention. One important application envisaged is as a leak detector, which discovers the location of an invisible leak by displaying a rise in the partial pressure of a specific component of the said gas when said component is temporarily applied to that part of the outside of the vacuum envelope. Such application is typical of many in which it is desired to make frequent observations of the said partial pressure over a long period.

It has been found that apparatus as in FIG. 1, where the saucer 4 is open to the room air, must be allowed to warm up to room temperature, at least after every few cycles of operation, so that ice and water which have accreted on the saucer and the thermocouple leads re-evaporate and do not accumulate. In FIG. 3, the saucer 4 is enclosed, except for an escape passage for nitrogen vapour, by sleeve 69 and cover plate 70, so that room air is excluded. Above the cover plate 70 is shown a liquid-nitrogen dispenser, of a kind alternative to that shown in FIG. 2, comprising a storage vessel 71 made of, or surrounded by, a mass of low-density foam-plastic which provides thermal insulation. In the latter case, the vessel 71 itself may comprise a metal tube, made with minimum wall thickness and from, e.g. copper-nickel alloy, so as to minimise access of heat by conduction (however, a tube fabricated from 25 μm-thick brass sheet has been found serviceable). In either case, the bottom of the vessel 71 is formed by, or has cemented to it, a relatively-thick block of metal (brass is suitable) 73 pierced by an axial hole 74 (suitably 1 to 1.5 mm in diameter).

A steel ball 75 (suitably 6 mm in diameter) rests in the top of hole 74 and, having been lightly hammered into the metal block 73 so as to form a seating ring about 2.5 mm outside diameter, seals the entrance liquid-nitrogen-tight until lifted by electromagnet 76. The electromagnet 76 is supported from block 73 by a squirrel-cage of rods 77, 78, etc., thus forming with ball 75 a ball-and-cage valve which releases liquid nitrogen from vessel 71, while the electromagnet 76 is actuated, to flow down the hole 74, and then down a hole 72 which extends through the thick thermally-insulating base or surround of vessel 71 and through plate 70. Thus a dose of liquid nitrogen falls into saucer 4. The size of this dose may be controlled by varying the time for which the electromagnet 76 is energised; it will also vary with the depth of liquid nitrogen and the consequent hydrostatic pressure at the value. Means for automatically compensating, if desired, for variations of liquid depth will be familiar to persons skilled in the art of, e.g., the electronic control system discussed below with reference to FIG. 5.

It is desirable that the diameter of hole 72 should be somewhat greater than that of 74, e.g. 3 mm if 72 is 1 to 1.5 mm as above. However it is also desirable that the diameter of hole 72 should be much less than its length; otherwise thermosiphon circulation of air within hole 72 may add substantially to the heat access to the vessel 71.

It is important to prevent access of moist room air to the interior of the vessel 71, at least whenever this is at a temperature below the dew point: if a water film is present between ball 75 and its seat in the metal block 73, then when liquid nitrogen is poured into vessel 71, the two will become cemented together by ice, and the valve will not open. Also, any ice particles falling into the liquid will tend to be stirred-up by the boiling liquid and may become trapped between ball and seat, so that the valve will not shut completely. (In this connection the annular groove shown at the bottom of vessel 71 provides beneficially a receptacle for any ice-sludge that may form). Accordingly vessel 71 is shown as covered by a lid 68 which (while allowing nitrogen vapour to escape) fits closely enough to keep out room air.

The coil 79 of electromagnet 76 may suitably be of about 15000 turns, of enamelled copper wire about 75 $\mu$m overall diameter; such has been found to lift ball 74 by 2–3 mm against up to 20 cm head of liquid nitrogen reliably when energised by 12 V, 30 mA. (The electrical conductance of copper is about 8 times greater at 78 K than at room temperature). Thus thin leads 80, e.g. of 125 $\mu$m Constantan wire, suffice to supply coil 79, and contribute negligible heat conduction into the liquid.

A similar copper-wire coil is used in the solenoid-actuator 82 which raises plate 16 against the lower end of funnel 3. In this case the coil 79 is fully shrouded by soft iron or steel (together with pole piece 83 inside the vacuum). It has been found that 25 V, 15–25 mA in a suitable coil is sufficient to actuate solenoid rod 81 over a stroke of 6–8 mm.

The operation of the cold trap of FIG. 3 will now be described with reference to FIG. 5. The voltage developed by thermocouple 6 (together with a reference junction at a fixed temperature) varies by about 6.5 mV between 78 K and 300 K. This voltage is applied to an inverting linear operational amplifier, or "op-amp", A with gain preset by resistor $R_1$. A DC voltmeter $M_1$ may be switched so as to indicate either the output of A (i.e., on a known non-linear scale, the trap temperature) or the voltage, adjustable by control potentiometer $R_2$, at the non-inverting input of op-amp B. The output of A is applied to both the inverting input of B and also to that of E (see below). Op-amp B has output limited by the two Zener diodes connected in series opposition, $Z_1$ and $Z_2$. Between the voltage limits set by $Z_1$, $Z_2$, the gain of B is adjustable by resistor $R_3$. Thus the output of B can be set, by adjusting $R_2$ and $R_3$ appropriately, to change from near-constancy at one limit to near-constancy at the other, and nearly linearly as the trap temperature varies between any one adjustable value and any other, and these limits may be set just below and just above the trap temperature at which said vapour component displays peak pressure.

The output of B is applied to op-amp C, connected as an inverting differentiator, and the output of C comprises accordingly a nearly-square pulse of one polarity as the trap temperature rises between the two said values, and of opposite polarity as it falls. The output of C cannot be much more than 1 V unless a bulky and specially-low-leakage differentiating capacitor is used; accordingly, a saturating (and inverting) op-amp, D, is used to raise these pulses to the (supply-limited) value of $\pm 14$ V (and to effect further squaring of their edges). The pulse output from D during the rise of temperature is used to operate a "gate", see below.

The output of A is also connected to differentiator op-amp E; and the output of E which is, say, positive only during, and throughout, the warming time is applied to transistor $T_2$ (via complementary transistor $T_1$ used as an amplifier and level-shifter) so as to switch on current, from the collector of $T_2$ to the opposite supply rail, through the "flap" actuator, 82 in FIG. 3. Diode $D_1$ is connected so as to suppress over-voltage on switch-off.

The ion current in the ionisation gauge is assumed here to flow from ion collector to earth through resistor $R_4$. It is likely that there will be mains-frequency and harmonics thereof present as unwanted components of the voltage across $R_4$; these are rejected, and the desired signal components due to pressure variations are transmitted, by a low-pass filter here shown as incorporating capacitors $C_1$, $C_2$, $C_3$; the signal voltage passes through, and is followed and/or amplified by op-amp F (gain = $\pm 1$ if $R_5 = 0$).

Op-amps F and G, and components between, constitute a sample-and-hold peak-reading circuit. The output of F is connected, only while switch $S_1$ is closed, to the rectifier circuit comprising diode $D_2$, capacitor $C_4$ and resistor $R_6$; and the rectifier output is connected to op-amp G (see below), for the same period, by switch $S_2$.

$S_1$ and $S_2$ are solenoid-actuated vacuum reed switches. The two solenoids may suitably be connected in series (each switch being rated for 6 V operation), and both are closed simultaneously, by the "gate" pulse from D already described. Diode $D_3$, shunted across the coils, suppresses the inductive over-voltage at cut-off, and also suppresses closure of these switches by the reverse pulse from D during cooling of the trap. It is suitable to choose $C_4 = 100$ $\mu$F (electrolytic) and $R_4 = 15$ kilohms; their time-constant is then 1.5 s, and is such that when $S_1$ and $S_2$ open, the voltage on $C_4$ is essentially still equal to the peak output from F during the "gate open" period, which is likely to be less than 0.5 s. On the other hand, during the period of a whole cycle, which is likely to exceed 6 s, the voltage on $C_4$ will become nearly zero and unlikely to exceed the next, possibly much smaller, peak output from F.

Only while switch $S_2$ is closed, $C_4$ is connected to capacitor $C_5$, through resistor $R_7$. $C_4$ is a high-insulation polyester or polycarbonate capacitor, 1 $\mu$F being a suitable value: $R_7$ should then be about 50 kilohms so that $C_5$ quickly follows $C_4$ but without exceeding the current rating of $S_2$. When $S_2$ is open, $C_5$ is isolated, except for connection to the very high input impedance of op-amp G connected as a voltage follower, and holds a constant voltage, indicated by $M_2$, until $S_2$ closes again. When $S_2$ closes, $C_2$ (having 1/100 capacitance of $C_4$) takes up almost unchanged the near-zero voltage to which $C_4$ has become discharged. By proper adjustment of $R_2$ and $R_3$ (as explained above) the duration for which this near-zero voltage remains on $M_2$ can be made very small.

Figure 5:
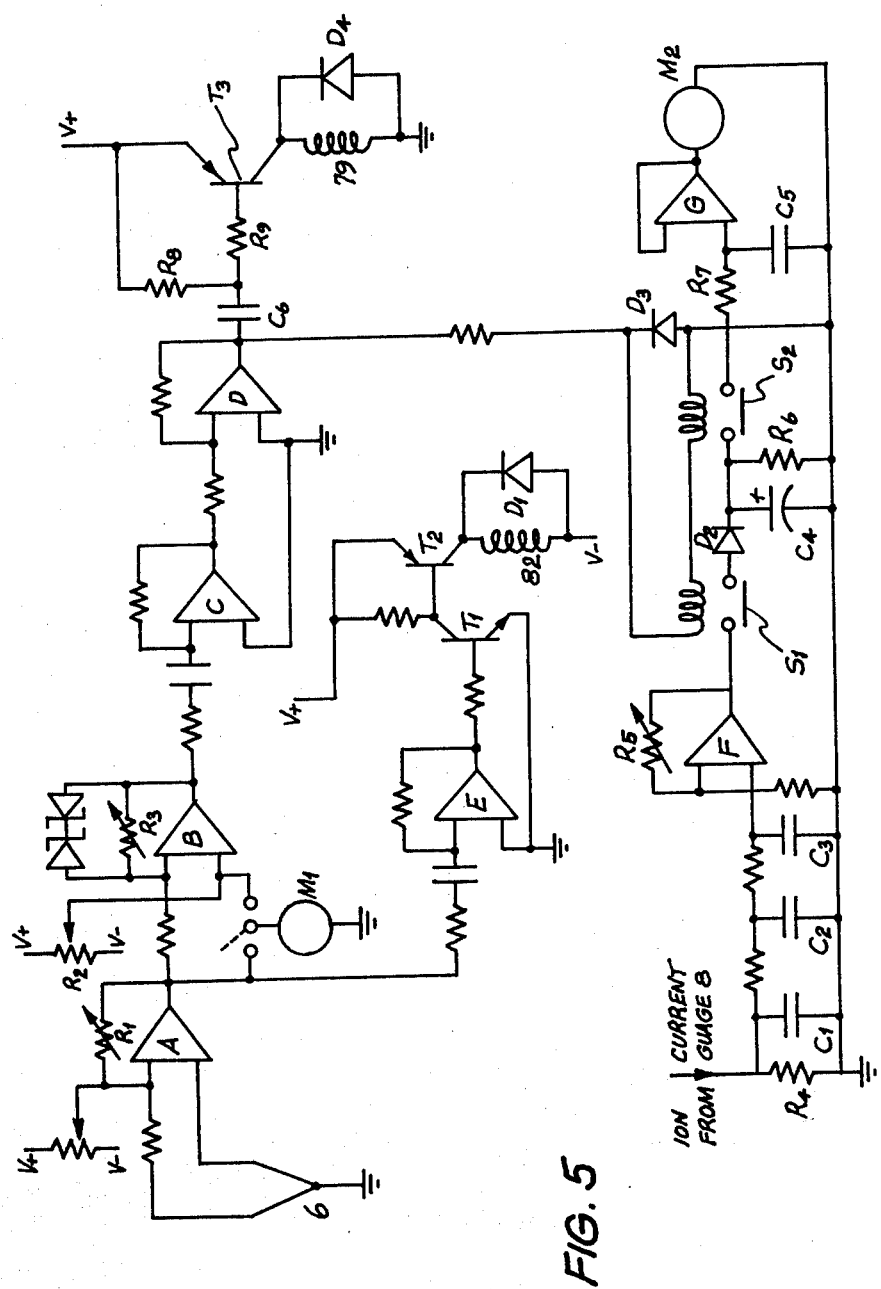
FIG. 5 is a circuit diagram of an electronic sub-system suitable for automatically operating the cold trap of FIG. 3 as a gauge registering the partial pressure of one vapour component in the vacuum system during each cycle of operation.

Finally, the output from D is also applied by coupling capacitor $C_6$ and base resistors $R_8$, $R_9$ to transistor $T_3$ which, with the polarities implicit in FIG. 5, causes a pulse of collector current to flow in $T_3$, immediately following the end of the "gate" pulse from D. This current flows from the collector to ground through the coil of the "dispenser", 79 in FIG. 3, for a time determined by $C_6$, $R_8$ and $R_9$, and thus a suitable dose of liquid nitrogen is delivered for the next cycle. Diode $D_4$ suppresses over-voltage on switch-off.

I claim:

1. A cold trap for use in a high vacuum system and adapted for rapid and repeated cooling and reheating, comprising a chamber closed at its upper end by a metallic diaphragm of a thickness of not more than 0.002 inches dished inwardly to receive a liquid coolant, an outlet to interconnect the chamber with a high vacuum system, and means to introduce into the diaphragm successive doses of liquid coolant, each dose sufficing by its complete evaporation to keep the trap cold for a period of less than one minute.

2. A cold trap as claimed in claim 1 in which the radius of curvature of the lowest part of the diaphragm is such that the area of the diaphragm which remains at the temperature of the coolant until all of the coolant has evaporated is larger than the effective area of the outlet.

3. A cold trap as claimed in claim 2 in which the radius of curvature of the diaphragm is at least five times the radius of a circle having the same surface area as the effective area of the outlet during evaporation of the coolant.

4. A cold trap as claimed in claim 2 in which means are provided to constrict the outlet such that it is smaller than the part of the diaphragm which remains at the temperature of the coolant until all the coolant has evaporated only during the warming time of the trap.

5. A cold trap as claimed in claim 1 in which the chamber tapers from the end closed by the diaphragm to its other end in which the outlet is situated.

6. A cold trap as claimed in claim 1, which additionally includes a pressure gauge disposed outside the chamber and adapted to be included in the high vacuum system, which pressure gauge serves to indicate the rise in pressure due to the evaporation of the condensed vapour that takes place as the temperature of the trap rises over a particular temperature range.

7. A cold trap a claimed in claim 1 in which the means to introduce successive doses of liquid coolant into the diaphragm comprises a liquid coolant reservoir positioned above the diaphragm and having an aperture in its underside controlled by a valve such that the coolant is retained in the reservoir except when the valve is opened.

8. A cold trap as claimed in claim 7 in which the valve comprises a steel ball resting on the aperture, a solenoid being positioned above the ball and adapted to raise it off the aperture when the solenoid is activated.

9. A cold trap as claimed in claim 1 in which a thermometric device is attached to the trap to indicate trap temperature.

10. A cold trap as claimed in claim 9 in which the thermometric device comprises a thermocouple soldered to the diaphragm.

* * * * *